United States Patent Office 3,529,940
Patented Sept. 22, 1970

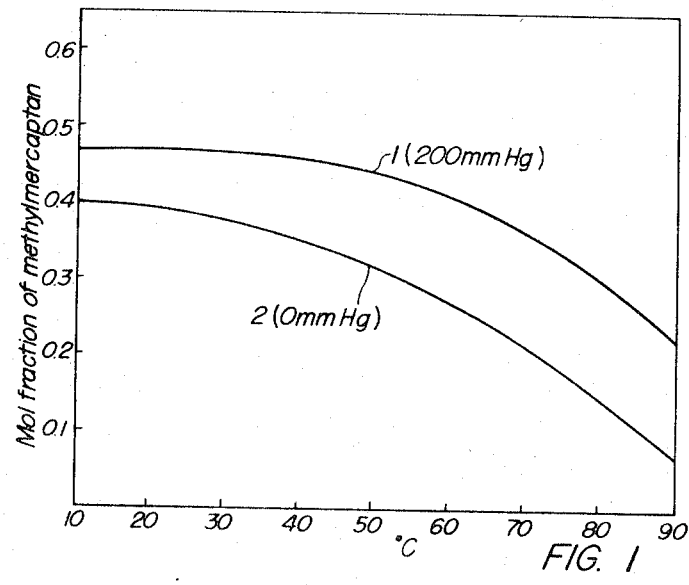
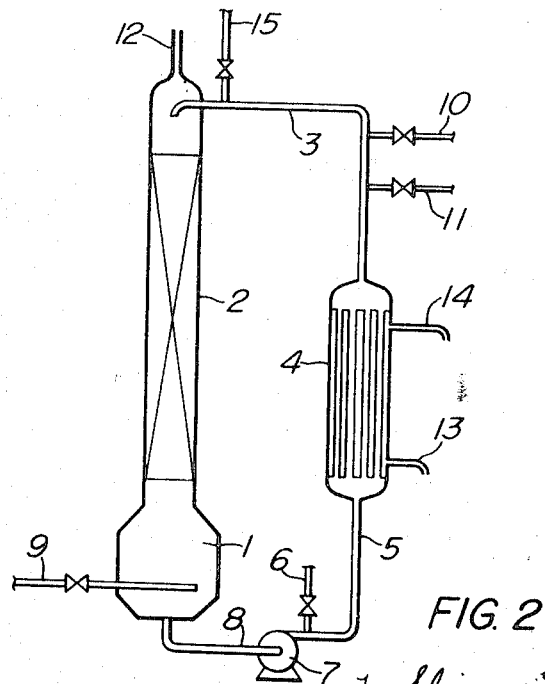

3,529,940
APPARATUS FOR TWO-STAGE PRODUCTION OF
β-METHYLMERCAPTOPROPIONALDEHYDE
Takesaburo Shima, Akio Yamagishi, Masao Sada, Hasunaga Shiozaki, and Mitsuyoshi Manabe, Niihama-shi, Japan, assignors to Sumitomo Chemical Company, Ltd., Osaka, Japan, a Japanese corporation
Original application Apr. 21, 1967, Ser. No. 632,639.
Divided and this application Feb. 4, 1969, Ser. No. 816,443
Claims priority, application Japan, Apr. 25, 1966, 41/26,498
Int. Cl. B01j; C07c 47/02
U.S. Cl. 23—288                                   5 Claims

ABSTRACT OF THE DISCLOSURE

Apparatus for a process for producing β-methylmercaptopropionaldehyde, an intermediate for the synthesis of methionine, from acrolein and methylmercaptan, characterized in that methylmercaptan is contacted with β-methylmercaptopropionaldehyde and, after the heat generation is substantially completed, the reaction product is contacted with acrolein. A packed column open at the top and having a reaction tank at the bottom, with recycling means including a heat exchanger.

---

This application is a division of our copending application, Ser. No. 632,639, filed Apr. 21, 1967.

This invention relates to a process for producing in high yield β-methylmercaptopropionaldehyde (hereinafter referred to as M-aldehyde) which is used as an intermediate for preparing methionine, an essential amino acid.

The M-aldehyde is obtained by reacting acrolein with methylmercaptan in the presence of a catalyst. This reaction is exothermic and, according to the measurement of the present inventors, the amount of heat generated in said reaction is about 14 Kcal./mol. Both the starting acrolein and the produced M-aldehyde are thermally unstable substances. Particularly, acrolein is liable to be denatured by readily bringing such reaction as polymerization. In the reaction of acrolein and methylmercaptan, therefore, a specific device for controlling the reaction temperature is required.

Heretofore, a variety of processes have been proposed for the production of M-aldehyde. One of these is, for example, a batch process in which a catalyst is added to a liquid of acrolein or methylmercaptan and then methylmercaptan or acrolein in the form of a liquid or gas is directly added to said liquid with cooling and stirring [J. Am. Chem. Soc., 70, 1450 (1948)]. In the known process, there have been adopted, in order to maintain the reaction temperature at below a definite temperature, procedures to cool the reaction system with a cooling medium or to control the rate of addition of the starting materials. However, the reaction accompanies particularly vigorous generation of heat at the initial stage and locally elevate the temperature of the reaction system, whereby side reaction products are formed and the lowering in yield is unavoidable. Further the process has not been favorable in reproductivity.

As a measure to overcome the above drawbacks, there has been proposed a process in which the reactants are diluted with solvents such as acetals or dioxanes to moderate the local heat generation in the reaction system (French Pat. No. 976,673). The process, however, actually requires the recovery of solvents and hence is not advantageous from the industrial standpoint.

There has also been proposed a process in which 67–90% of the theoretical amount of acrolein is first added to methylmercaptan and then the balance of the acrolein is quickly added to effect the reaction (U.S. Pat. No. 2,676,190). According to the process, the commercial scale production of M-aldehyde is carried out in such a manner that a reaction liquid is recycled using a long tubular reactor and a mixed liquid of methylmercaptan and catalyst and acrolein in the form of a liquid are separately and divisionally introduced under pressure through one or more openings in the course of said recycle passage, thereby reacting the starting materials under pressure. In the process, the reaction heat generated is removed by attaching a jacket to the reaction tube and cooling the tube with water. However, in order to efficiently remove the reaction heat, it is necessary to make the reaction tube slender and to make the amount of recycled liquid larger. Thus, the process not only has such operational and economical disadvantages that the power required for the recycle is great, but also suffers from such drawback that the interior of the reaction tube is liable to be clogged by polymers formed.

As mentioned above, in every conventional process for the preparation of M-aldehyde, the control of reaction temperature is effected only by physical means. Therefore, the control has not been satisfactory, and the yield of M-aldehyde has ordinarily been 92–95%, and not more than about 98% even when methylmercaptan was used in great excess.

Further, in the commercial continuous processes, the reaction has been effected under pressure, as mentioned above, though in said batch process, the reaction has been effected at atmospheric pressure. This is probably due to the fact that methylmercaptan has such a low boiling point as 6° C. and hence is liable to become a gas, and the formation of a heterogeneous gas-liquid phase in a slender reaction tube has been considered disadvantageous for the thorough contact of the reactants as well as for the effective removal of reaction heat.

As the result of analysis of the synthesis reaction of M-aldehyde, the present inventors have found that when there is adopted such two-stage reaction process that methylmercaptan is first reacted with M-aldehyde and then the reaction product is reacted with acrolein, the heat generated in the formation of M-aldehyde can be divided into 9 and 5 Kcal./mol, whereby the reaction temperature can be controlled by a simple cooling means and M-aldehyde can be synthesized in high yield. The present inventors have further found the fact that according to the above process, the reaction can be advantageously effected at atmospheric pressure.

An object of the present invention is to produce M-aldehyde in a high yield by effectively controlling the reaction temperature.

Another object is to produce M-aldehyde with operational advantages.

The present invention provides a process for producing M-aldehyde from acrolein and methylmercaptan, characterized in that methylmercaptan is first contacted with M-aldehyde and, after the generation of heat has substantially been completed, the resulting reaction product is contacted with acrolein.

In practicing the present invention, methylmercaptan is first contacted and reacted with M-aldehyde. In this case, it is considered that hemithioacetal or thioacetal might probably be formed. The amount of heat generated in this case is about ⅔ of the amount of heat in the case where methylmercaptan is reacted directly with acrolein, and therefore the cooling operation becomes easier.

In the reaction at this stage, no catalyst is particularly required, but since the two materials are required to be thoroughly contacted, the contact is ordinarily effected in a mixing tank.

M-aldehyde is a high boiling substance and hence is added in the form of a liquid to the mixing tank, but methylmercaptan may be added in the form of a liquid or a gas. It is desired that methylmercaptan be favorably dispersed in M-aldehyde and the generated heat be removed by an effective procedure. When methylmercaptan is added in the form of a liquid, a part of the methylmercaptan is vaporized, and therefore local heat generation can be dispersed. However, it appears that methylmercaptan is desirably added in the form of a gas, because it is readily dispersed by the agitating action of its bubbles. Of course, the adoption of mechanical stirring is markedly effective. As a cooling means, a jacket or cooling coil may be attached directly to the vessels. Alternatively, there may be adopted such a cooling procedure that a heat exchanger is placed outside and the reaction liquid is recycled therethrough.

In the above contact, methylmercaptan is required to be reacted with M-aldehyde as much as possible. Therefore, M-aldehyde is used in an amount of at least 1 mol per mol of methylmercaptan. In case the amount of M-aldehyde employed is larger, the temperature control becomes easier due to the diluting action of M-aldehyde. However, if the amount is excessively large, there are brought about operation disadvantages. Ordinarily, 1.5–200 mols, preferably 10–100 mols, of M-aldehyde is used per mol of methylmercaptan.

The temperature at said contact stage is 10°–90° C., preferably 40°–80° C. In case the contact is effected at a temperature lower than 10° C., a cooling medium is required to cool the system. And in case the contact is carried out at a temperature higher than 90° C., methylmercaptan can be dissolved in only a small amount and M-aldehyde is undesirably denatured with heat.

The contact can advantageously be effected particularly at atmospheric pressure, though it may also be carried out under pressure. In accordance witht he present process, methylmercaptan is dissolved in and reacted with liquid M-aldehyde (B.P. about 150° C. at 760 mm. Hg). Therefore, not only the partial pressure of methylmercaptan on the reaction liquid becomes low but also the heat generated in the above case is small in amount and is readily removable, with the result that no tubular reactor is required to be used and the reaction can be successfully effected at atmospheric pressure.

In the accompanying drawings, FIG. 1 shows the partial pressure of methylmercaptan on the methylmercaptan-M-aldehyde raection liquid. In FIG. 1, the curve ① shows the relationship between the concentration of methylmercaptan (which has reacted) in the methylmercaptan-M-aldehyde reaction liquid and the temperature of said liquid when the partial pressure of methylmercaptan becomes 200 mm. Hg, and the curve ② shows said relationship when said partial pressure becomes substantially 0 mm. Hg.

The curve ② may be approximately decided by the equation $$X = -5.28 \times 10^{-5} t^2 + 1.25 \times 10^{-3} t + 0.385 \quad (1)$$

where X is the molar fraction of methylmercaptan in the methylmercaptan-M-aldehyde reaction liquid, $$X = \frac{\text{Mols of methylmercaptan charged in M-aldehyde}}{\text{Total mols of M-aldehyde and methylmercaptan charged in M-aldehyde}}$$

and $t$ is the temperature (° C.) of the methylmercaptan-M-aldehlde reaction liquid.

In FIG. 1, in the area below the curve ②, the partial pressure of methylmercaptan on the methylmercaptan-M-aldehyde reaction liquid becomes substantially 0 mm. Hg, and the reaction can be effected in an open system at atmospheric pressure.

The contact of methylmercaptan and M-aldehyde is effected until the heat generation of the reaction at this stage has substantially been completed, in order that a part of the formation heat of M-aldehyde has previously been divisionally discharged. For this, it is necessary to contact the two ordinarily for 0.1–60 minutes, preferably for 5–30 minutes.

Subsequently, the thus obtained reaction product of methylmercaptan and M-aldehyde is contacted with acrolein in the presence of a catalyst. It is considered that at this stage, the preformed hemithioacetal or thioacetal reacts with acrolein to form M-aldehyde. At this contact stage, heat is generated in such a markedly small amount as about 5 Kcal./mol and methylmercaptan is in a state diluted with M-aldehyde, so that it is easier to inhibit local temperature increase. This is greatly convenient, because acrolein is particularly polymerizable and the increase of reaction temperature at said contact stage should be inhibited as far as possible. At this contact stage, acrolein may be added directly to said reaction product liquid with cooling, or said reaction liquid and acrolein may be continuously fed to another vessel with stirring and cooling. Alternatively, the two may be charged in a tubular reactor and contacted each other with external cooling. The control of reaction temperature at the time of contact may be effected in such a manner that the feed liquids are previously cooled and are then mixed and reacted with each other to keep the temperature increase to below a certain degree. When a part of M-aldehyde obtained through the above procedures is recycled to the contact zone of the first stage, it is possible to practice the present invention in a continuous manner.

The catalyst to be used in the second stage reaction includes conventional catalysts such as mercury methylmercaptide, cupric acetate, organic peroxides, organic bases, mixtures of organic bases and organic acids, and ion exchange resins. The catalyst and acrolein may be fed either together or separately. Ordinarily, acrolein is used in an amount approximately the equivalent of methylmercaptan, but may be used in an amount somewhat smaller or larger than the equivalent. In case acrolein is used in an amount less than the equivalent, methylmercaptan migrates into M-aldehyde, and when the mixture is recycled, it is possible to prevent the incorporation of acrolein into the contact zone of the first stage, with the result that the heat generation due to the direct reaction of methylmercaptan with acrolein can advantageously be avoided. On the other hand, in case acrolein is used somewhat in excess, methylmercaptan is substantially not incorporated as unreacted material into M-aldehyde. Since a small amount of methylmercaptan incorporated into M-aldehyde is difficultly separable, the use of somewhat excess of acrolein is markedly advantageous when purification is taken into consideration. In case the excessive amount of acrolein is too great in the case where the process is carried out in a continuous manner, unreacted acrolein introduced into the contact zone of the first stage becomes larger in amount which reacts directly with methylmercaptan to bring about local heating of the reaction system. Therefore, the excessive amount is preferably 0.5–20 mol percent.

The reaction conditions to be adopted at the second stage are substantially the same as those at the first stage. That is, the reaction is effected either at atmospheric pressure or under pressure at 10°–100° C., preferably at 30°–70° C. The reaction is carried out until the formation of M-aldehyde has been substantially complete. The contact time is 1–180 minutes, preferably 1–60 minutes.

The desired M-aldehyde is recovered by taking out the resulting reaction liquid and subjecting the same to ordinary rectification.

In accordance with the present process effected in the above manner, the reaction temperature can be easily controlled and no local temperature increase is substantially brought about, with the result that the desired product is obtainable in such a high yield as 99% or more.

One example of the reaction apparatus to be employed in the present invention will be illustrated below with reference to FIG. 2. In FIG. 2, methylmercaptan in the form of a gas is injected through nozzle 9 into M-aldehyde in tank 1. The tank 1 is provided at the upper part with packed column 2 so as to make the absorption of methylmercaptan complete, and the top of the packed column 2 is opened to air through conduit 12. The reaction liquid is recycled from the bottom of the tank 1 to the packed column 2 through conduit 8, pump 7, conduit 5, pipe of heat exchanger 4 and conduit 3. A part of the reaction liquid from the tank 1 is withdrawn through pipe 6 on the exit side of the pump to confirm that no heat generation has been caused. Cooling water is supplied through conduit 13 to the exterior of the pipe of the heat exchanger 4 and is withdrawn through conduit 14 to remove the reaction heat. Acrolein and a catalyst are fed through conduits 11 and 10, respectively, and a part of the reaction liquid is withdrawn through conduit 15 so as to maintain the liquid surface of the tank 1 at a definite level. The reaction of M-aldehyde with methylmercaptan is effected in the tank 1 and the packed column 2, and heat generated therein is removed by means of the heat exchanger 4. The reaction of acrolein with the reaction liquid of methylmercaptan and M-aldehyde is carried out in the conduit 3.

Thus, according to the present invention, the reaction temperature can be easily controlled and M-aldehyde can be produced in a high yield and high purity. Further, the reaction can be carried out at atmospheric pressure with high conversion and M-aldehyde can be advantageously prepared on commercial scale.

The following examples illustrate the prevent invention.

EXAMPLE 1

A 1 l. four-necked flask was provided with a stirrer, a liquid feed opening (for M-aldehyde), a gas injection opening (for methylmercaptan), a thermometer and a pipe opening to air. Into the flask was charged 388 g. of M-aldehyde (purity: 99.5% by weight). The whole body of the flask was immersed in ice water at 0° C., and 96.5 g. of methylmercaptan with a purity of 99.5% by weight was injected in the form of a gas into the M-aldehyde with stirring and the temperature in the flask was maintained at 30° C. When the injection of methylmercaptan was initiated, the temperature increased to initiate the reaction. No methylmercaptan gas was discharged in air at all. After termination of the injection, the temperature of the cooling water was elevated to 30° C. in about 15 minutes, and the interior of the flask was maintained at 30° C.

The liquid formed was thoroughly mixed with 1.7 g. of a catalyst (25% by weight of pyridine+75% by weight of acetic acid), and then 120.0 g. of acrolein (purity: 96.3% by weight) was added to the mixture. During this time, the interior of the flask was maintained at below 40° C. by use of cooling water. By the above reaction, 606 g. of a colorless transparent liquid was obtained. Analysis of the thus obtained liquid showed that the increase in amount of M-aldehyde corresponded to 206 g. and the yield based on methylmercaptan was 99.1%. In contrast to this, in the case where methylmercaptan was reacted directly with acrolein while cooling the system with ice water at 0° C., the yield of M-aldehyde was 92%.

The analysis of M-aldehyde in the product liquid was effected according to gas-chromatography.

EXAMPLE 2

A 1 l. four-necked flask was provided with a stirrer, a reflux condenser, a thermometer, a liquid feed opening (for M-aldehyde) and a gas injection nozzle (for methylmercaptan). To the bottom of the flask, a piping was connected so as to withdraw a reaction liquid by overflow. A second four-necked flask was provided with a stirrer, a thermometer, 3 liquid feed openings (for a liquid from the first flask, for acrolein and for a catalyst, respectively), and a reflux condenser. To the bottom of the second flask were connected a piping for the withdrawal of a product liquid by overflow and a piping for the withdrawal of the liquid to be recycled to the first flask. The two flasks were individually immersed in separate thermostat tanks and were connected with a pipe so that a liquid can be withdrawn from the bottom of the second flask and fed with a pump to the first flask. 359 g. of M-aldehyde was charged in each of the first and second flasks. Into the first flask, 294.4 g./hr. of methylmercaptan gas with a purity of 99.5% (by volume) was injected, and into the second flask, 400 g./hr. of acrolein with a purity of 95.7% by weight and 7.2 g./hr. of a catalyst (25% by weight of pyridine+75% by weight of acetic acid) were continuously fed. A part of the reaction liquid of the first flask was withdrawn through the piping prior to introducing the liquid into the second flask to find that no substantial heat generation had occured. The temperature in each flask was maintained at 50°±2° C. by controlling the temperature of each thermostat tank. After continuing the reaction for about 4 hours, the product liquid was withdrawn in an amount corresponding to the amount formed in a period of 30 minutes to obtain 348 g. of a colorless transparent liquid. The product liquid was analyzed in the same manner as in Example 1 to find that the amount of M-aldehyde in the liquid was 90.4% by weight and the yield thereof based on methylmercaptan was 99.2%. Further, the material balance (Amount of product/Amount of feed stock) was substantially 100%, and the methylmercaptan and acrolein had been scarcely discharged despite the fact that the reaction system had been opened to air.

EXAMPLE 3

A reaction apparatus similiar to that shown in FIG. 2 which had a total inner volume of about 10 l. was prepared. Into the reaction apparatus, about 4 l. of M-aldehyde was charged so as to fill a part of the tank 1, the pump 7, the heat exchanger 4 and the piping portion, and the pump 7 was put in motion to recycle the liquid. The amount of the liquid recycled was made about 20 times the amount of product liquid. Subsequently, methylmercaptan gas (purity: 99.5% by volume), a catalyst (25% by weight of pyridine+75% by weight of acetic acid) and acrolein (purity: 96.0% by weight) in amounts as shown in Table 1 were fed through conduits 9, 10 and 11, respectively. A part of the reaction liquid from the tank 1 was withdrawn through the side pipe 6 to find that heat generation had been complete. The reaction product was withdrawn through the conduit 15 so as to maintain the liquid surface of the tank at a definite level. Cooling water was passed into the heat exchanger so as to maintain the reaction temperature constant. The reaction temperature was about 52° C. in the tank 1 and was about 50° C. in the conduit 3. After continuing the reaction for 8 hours, a sample in an amount corresponding to the amount formed in a period of 15 minutes was recovered and was subjected to calculation of material balance and to analysis of M-aldehyde. The analysis method was the same as in Example 1.

The reactions of Run Nos. 1 to 3 were effected using the packed column 2, and the reaction of Run No. 4 were effected using an empty column.

TABLE 1

| Run No. | Acrolein (A) (g./hr.) | Methyl mercaptan (B) (g./hr.) | Catalyst (g./hr.) | A/B molar ratio | Tank temperature (°C.) | Amount of product liquid (g./15 min.) | Concentration of M-aldehyde in product liquid (percent) | Material balance (percent) | Yield* (percent) |
|---|---|---|---|---|---|---|---|---|---|
| 1 | 2,190 | 1,820 | 40 | 0.995 | 50 | 1,008 | 95.9 | 99.7 | 99.0 |
| 2 | 2,200 | 1,800 | 40 | 1.011 | 50 | 1,005 | 95.8 | 99.5 | 99.2 |
| 3 | 1,100 | 900 | 20 | 1.011 | 80 | 500 | 95.0 | 99.0 | 96.9 |
| 4 | 2,200 | 1,800 | 40 | 1.011 | 50 | 1,000 | 95.6 | 99.0 | 97.5 |

*The yield in Run No. 1 is based on acrolein, and the yields in Run Nos. 2-4 on methylmercaptan.

What is claimed is:

1. An apparatus for producing β-methylmercaptopropionaldehyde which comprises in combination a packed column open at the top end thereof, a reaction tank connected to the bottom end of said column, methylmercaptan-feeding means inserted into said tank, recycling means for reaction liquid connecting the bottom of said tank with the upper portion of said column, a heat exchanger located in said recycling means intermediate said tank and said packed column, acrolein and catalyst-feeding means connected to said recycling means downstream of said heat exchanger and upstream of said packed column, means for withdrawing part of said reaction product from said recycling means positioned downstream of said acrolein and catalyst feeding means and upstream of said packed column in said recycling means.

2. An apparatus according to claim 1 wherein said acrolein and catalyst feeding means comprise one inlet to said recycling means.

3. An apparatus according to claim 1 wherein said acrolein and catalyst feeding means comprise two separate inlets to said recycling means.

4. An apparatus according to claim 1 further comprising means for pumping said reaction liquid through said recycling means, said pumping means located in said recycling means downstream of said reaction tank and upstream of said heat exchanger.

5. An apparatus according to claim 4 further comprising means to withdraw a sample from said recycling means, said sample withdrawal means located downstream of said pumping means and upstream of said heat exchanger.

References Cited

UNITED STATES PATENTS

| | | | |
|---|---|---|---|
| 2,453,837 | 11/1948 | Fisher et al. | 23—285 |
| 3,310,367 | 3/1967 | Mavrovic | 23—283 X |
| 3,359,075 | 12/1967 | Lefebvre et al. | 23—285 |

JOSEPH SCOVRONEK, Primary Examiner

U.S. Cl. X.R.

23—283, 285; 260—601